(12) United States Patent
Lee et al.

(10) Patent No.: US 11,352,245 B2
(45) Date of Patent: Jun. 7, 2022

(54) BEVERAGE DISCHARGER

(71) Applicant: LG ELECTRONICS INC., Seoul (KR)

(72) Inventors: Daewoong Lee, Seoul (KR); Kyungbin Lee, Seoul (KR); Jinpyo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 234 days.

(21) Appl. No.: 16/508,494

(22) Filed: Jul. 11, 2019

(65) Prior Publication Data

US 2020/0017348 A1 Jan. 16, 2020

(30) Foreign Application Priority Data

Jul. 12, 2018 (KR) .................. 10-2018-0081009

(51) Int. Cl.
*B67D 1/00* (2006.01)
*B67D 1/04* (2006.01)
*B67D 1/08* (2006.01)

(52) U.S. Cl.
CPC ......... *B67D 1/0081* (2013.01); *B67D 1/0015* (2013.01); *B67D 1/04* (2013.01); *B67D 1/0888* (2013.01); *B67D 2001/0087* (2013.01); *B67D 2001/0093* (2013.01)

(58) Field of Classification Search
CPC .......... B67D 1/0081; B67D 2001/0087; B67D 2001/0093
USPC .......................................................... 99/275
See application file for complete search history.

(56) References Cited

U.S. PATENT DOCUMENTS

| | | | | | |
|---|---|---|---|---|---|
| 3,539,151 | A | * | 11/1970 | Reid | F16K 31/44 251/242 |
| 4,934,566 | A | * | 6/1990 | Guerette | B67D 1/1466 137/554 |
| 5,431,302 | A | * | 7/1995 | Tulley | B67D 1/1213 222/14 |
| 9,624,086 | B2 | * | 4/2017 | Banning | B67D 3/04 |
| 2013/0062366 | A1 | * | 3/2013 | Tansey | B67D 1/0021 222/102 |
| 2017/0016665 | A1 | * | 1/2017 | Lachermeier | B67D 3/0012 |
| 2017/0057802 | A1 | * | 3/2017 | Lee | B67D 1/1466 |
| 2017/0283234 | A1 | * | 10/2017 | Van Der Weij | B67D 1/0004 |
| 2017/0297886 | A1 | * | 10/2017 | Van Der Weij | B01F 3/04787 |

* cited by examiner

*Primary Examiner* — Jeremy Carroll
(74) *Attorney, Agent, or Firm* — Ked & Associates LLP (57) ABSTRACT

A beverage discharger may include a dispenser case; a channel body at least partially disposed in the dispenser case, the channel body having a first dispenser channel defined therein that communicates with a beverage discharge channel; a discharge body coupled to the channel body and having a second dispenser channel defined therein that communicates with the first dispenser channel, the discharge body extending vertically in an elongated manner; an ascending and descending body connected to the dispenser case in an ascending and descending manner; a shaft connected to the ascending and descending body to ascend and descend with the ascending and descending body, the shaft having, at a bottom portion, a packing that opens and closes the second dispenser channel; and at least one guide rib formed on an inner face of the discharge body to guide the bottom portion of the shaft.

21 Claims, 6 Drawing Sheets

BEVERAGE DISCHARGER

CROSS-REFERENCE TO RELATED APPLICATION(S)

The present application claims priority to Korean Patent Application No. 10-2018-0081009, filed in Korea on Jul. 12, 2018, the entire contents of which is incorporated herein for all purposes by this reference.

BACKGROUND

1. Field

A beverage discharger, and more particularly, a beverage discharger included in a beverage maker are disclosed herein.

2. Background

A beverage is collectively referred to as a drinkable liquid, such as alcohol, or tea, for example. Beverages may be divided into various categories, such as water (drinking water) to solve a thirst, a fruit drink with a unique flavor and taste, a soft drink providing a refreshing feeling, a beverage which may provide an awakening effect, or an alcoholic beverage with an alcohol effect, for example.

A representative example of such a beverage is beer. Beer is made by sprouting barley to make malt, juicing the malt to make a juice, adding hop into the juice, and then fermenting the juice with yeast.

Consumers may purchase processed products made by a beer producing company or drink house beer (or handmade beer) made by fermenting ingredients of beer in a home or bar. House beer may be produced in more varieties than the processed products and may be produced based on a consumer's taste.

The ingredients for beer production may be water, malt, hop, yeast, and a flavoring additive, for example. The yeast may be referred to as leaven and added to the malt to ferment the malt or to help produce alcohol and carbonic acid. The flavoring additive is an additive that enhances a taste of the beer, such as fruit, syrup, or vanilla beans, for example.

Generally, house beer may be passed through a total of three stages, including a wort production stage, a fermentation stage, and an aging stage. It may take from 2 to 3 weeks from the wort production stage to the aging stage.

It is important that house beer maintains an optimum temperature during the fermentation stage, and the easier the house beer is to produce, the greater a convenience of a user. Recently, a beverage maker, which may easily produce house beer at a home or in a bar, is gradually being used. This beverage maker is preferable to produce the beer safely and easily.

BRIEF DESCRIPTION OF THE DRAWINGS

Embodiments will be described in detail with reference to the following drawings in which like reference numerals refer to like elements, and wherein.

DETAILED DESCRIPTION

Hereinafter, embodiments will be described in detail with reference to drawings. Wherever possible, the same or like reference numerals have been used to indicate the same or like elements and repetitive disclosure has been omitted.

Hereinafter, beer is used as an example of a beverage produced using a beverage maker, but the type of the beverage produced using the beverage maker is not limited to the beer. Various types of beverages may be produced by the beverage maker according to embodiments.

Figure 1:
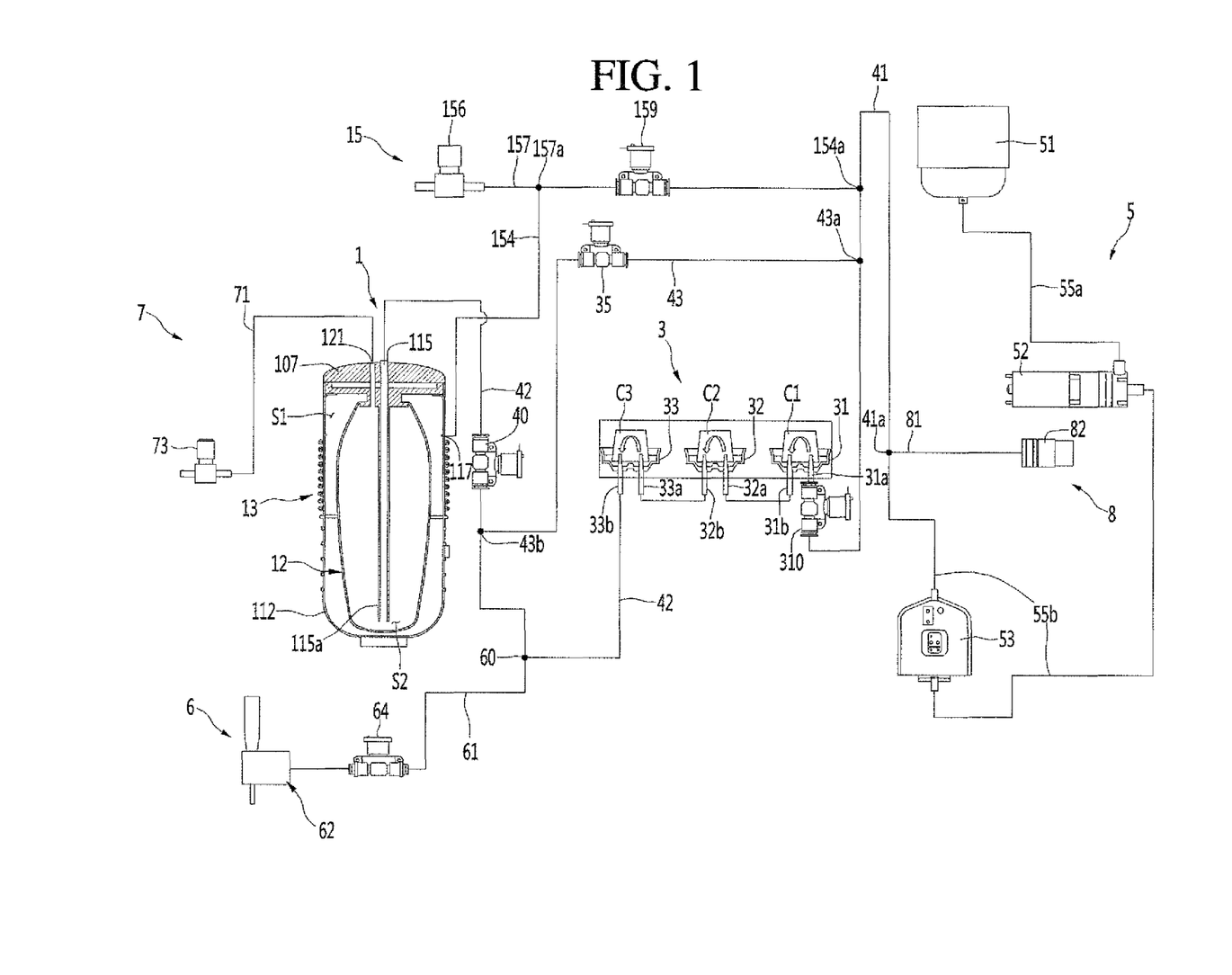
FIG. 1 is a schematic diagram of a beverage maker according to an embodiment.

FIG. 1 is a schematic diagram of a beverage maker according to an embodiment. The beverage maker may include a fermenting module 1. In the fermenting module 1, beverage fermentation may proceed.

The beverage maker may include a water supply module 5. The water supply module 5 may supply water.

The beverage maker may include an ingredient feeder 3 having ingredient receiving portions or containers 31, 32, and 33 that receive ingredients necessary to produce the beverage therein. The beverage maker may also include main channels 41 and 42 that connect the water supply module 5 and the fermenting module 1 with each other.

The beverage maker may include a beverage discharger 6 that discharges a beverage produced in the fermenting module 1 to an outside. The beverage discharger 6 may be connected to second main channel 42, whereby the beverage discharged from the fermenting module 1 may pass through a portion of the second main channel 42 and be guided to the beverage discharger 6.

The beverage maker may further include a gas discharger 7. The gas discharger 7 may be connected to the fermenting module 1 to discharge a gas generated during production of the beverage.

The beverage maker may further include an air injector 8 that injects air. The air injector 8 may be connected to the water supply module 5 or first main channel 41. The air injector 8 may include an air pump 82.

The beverage maker may further include an air regulator 15 that regulates a pressure between an inner wall of a fermentation vessel 112 and an outer face of the fermentation container 12.

Hereinafter, the fermenting module 1 will be described.

The fermenting module 1 may include fermentation vessel 112 having an opening defined therein, and a fermentation lid 107 that opens and closes the opening. A space S1 in which fermentation container 12 may be received may be defined in the fermentation vessel 112. That is, the fermentation container 12 may be received in the fermentation vessel 112.

The fermentation container 12 may be a separate container provided such that beverage ingredients and a finished beverage are not in contact with the inner wall of the fermentation vessel 112. The fermentation container 12 may be removably provided in the fermentation vessel 112. The fermentation container 12 may be mounted inside the fermentation vessel 112 to ferment the beverage in the fermentation vessel 112. Further, the fermentation container 12 may be withdrawn to the outside of the fermentation vessel 112 after use is complete.

The fermentation container 12 may be a pack that receives ingredients for beverage production therein. The fermentation container 12 may be formed of a flexible material, for example, such that the fermentation container 12 may be easily inserted into the fermentation vessel 112 and may be contracted and expanded by a pressure. However, embodiments are not limited thereto, for example, the fermentation container 12 may contain a PET (polyethylene terephthalate) material.

In the fermentation container 12, a beverage producing space S2 may be defined in which beverage ingredients may be received and the beverage produced. An area of the fermentation container 12 may be smaller than an area of the internal space S1 of the fermentation vessel 112.

The fermentation container 12 may be inserted and received in the fermentation vessel 112 with ingredients received therein. The fermentation container 12 may be inserted into the fermentation vessel 112 and received in the fermentation vessel 112 while the fermentation lid 107 is open.

The fermentation lid 107 may seal the fermentation vessel 112 after the fermentation container 12 is inserted into the fermentation vessel 112. The fermentation container 12 may assist fermentation of the ingredients while in a state of being received in the internal space S1 sealed by the fermentation vessel 112 and the fermentation lid 107. The fermentation container 12 may be expanded by the pressure therein during production of the beverage. When the beverage received therein is discharged and air supplied between the inner face of the fermentation vessel 112 and the outer face of the fermentation container 12, the fermentation container 12 may be compressed by air inside the fermentation vessel 112.

The fermentation lid 107 may seal the interior of the fermentation vessel 112. The fermentation lid 107 may be disposed at a top of the fermentation vessel 112 to cover the opening. The fermentation lid 107 may have a main channel connection 115 connected to the main channel, more specifically, to the second main channel 42. The main channel connection 115 may communicate with the beverage production space 52 of the fermentation container 12.

A tube 115a that communicates with the main channel connection 115 may be provided in a vertically extended manner inside the fermentation container 12. A bottom of the tube 115a may be adjacent to a bottom of the fermentation container 12 and the beverage in the fermentation container 12 may be easily suctioned into the tube 115a during discharge of the beverage.

The fermentation vessel 112 may have a temperature regulator 13. The temperature regulator 13 may change an internal temperature of the fermentation vessel 112. The temperature regulator 13 may heat or cool the fermentation vessel 112. The temperature regulator 13 may regulate the temperature of the fermentation vessel 112 to an optimal temperature for beverage fermentation.

The temperature regulator 13 may include at least one of a cooling cycle apparatus or a heater. However, the temperature regulator 13 is not limited thereto, and in one embodiment, the temperature regulator 13 may include a thermoelectric element (TEM).

In one embodiment, the cooling cycle apparatus of the temperature regulator 13 may cool the fermentation vessel 112 to regulate the temperature of the fermentation vessel 112. The cooling cycle apparatus may include a compressor, a condenser, an expansion apparatus, and an evaporator, for example. The evaporator may be disposed to be in contact with an outer face of the fermentation vessel 112. The evaporator may be composed of an evaporation tube that is wounded on the outer face of the fermentation vessel 112.

Hereinafter, main channels 41 and 42 and a bypass channel 43 will be described.

As described above, the main channels 41 and 42 may include first main channel 41 that connects the water supply module 5 and the ingredient feeder 3 and second main channel 42 that connects the ingredient feeder 3 and the fermenting module 1. That is, the first main channel 41 may guide the water supplied from the water supply module 5 to the ingredient feeder 3, and the second main channel 42 may guide a mixture of the ingredient discharged from the ingredient feeder 3 and the water to the fermenting module 1.

One or a first end 41a of the first main channel 41 may be connected to the water supply module 5 and the other or a second end thereof may be connected to the ingredient feeder 3. An ingredient supply valve 310 that opens and closes the first main channel 41 may be provided on the first main channel 41. The ingredient supply valve 310 may be part of the ingredient feeder 3. The ingredient supply valve 310 may be opened upon insertion of additives to be respectively received in the ingredient receiving portions 31, 32, and 33 to open the first main channel 41.

One or a first end of the second main channel 42 may be connected to the main channel connection 115 of the fermenting module 1 and the other or a second end thereof may be connected to the ingredient feeder 3. A main valve 40 for that opens and closes the second main channel 42 may be provided on the second main channel 42.

The main valve 40 may open when the water is fed to the fermentation container 12 to open the second main channel 42. The main valve 40 may be closed during the cooling of the fermentation vessel 112 to close the second main channel 42. The main valve 40 may open when air is injected into the fermentation container 12 to open the second main channel 42. The main valve 40 may open when additives are fed into the fermentation container 12 to open the second main channel 42. The main valve 40 may be closed during fermentation of the ingredients to seal the inside of the fermentation container 12. The main valve 40 may be closed during beverage aging and storing to seal the inside of the fermentation container 12. The main valve 40 may be opened at beverage discharging by the beverage discharger 6 to open the second main channel 42 and the beverage in the fermentation container 12 may pass through the main valve 40 and flow to the beverage discharger 6.

The main channels 41 and 42 may be one continuous channel when the beverage maker does not include the ingredient feeder 3. When the beverage maker includes the ingredient feeder 3, the beverage maker may further include the bypass channel 43 configured to allow the water or air to bypass the ingredient receiving portions 31, 32, and 33.

The bypass channel 43 may bypass the ingredient receiving portions 31, 32, and 33 and connect the first main channel 41 and the second main channel 42 with each other. One or a first end 43a of the bypass channel 43 may be connected to the first main channel 41 and the other or a second end 43b thereof may be connected to the second main channel 42. That is, the first end 43a of the bypass channel 43 may be connected between the water supply module 5 and the ingredient supply valve 310 with respect to the first main channel 41 and the second end 43b thereof may be connected between the main valve 40 and the ingredient feeder 3 with respect to the second main channel 42.

The bypass channel 43 may have a bypass valve 35 that opens and closes the bypass channel 43. The bypass valve 35 may open the bypass channel 43 when the water supplied from the water supply module 5 is supplied to the fermentation container 12. The bypass valve 35 may open the bypass channel 43 when the air injected from the air injector 8 is supplied to the fermentation container 12.

Hereinafter, the ingredient feeder 3 will be described.

When producing beer using the beverage maker, ingredients for producing the beer may include water, malt, yeast, hop, and flavoring additive, for example. The beverage maker may include both the ingredient feeder 3 and the fermentation container 12, and the ingredients for beverage production may be dispersed and received in the ingredient feeder 3 and fermentation container 12. The fermentation container 12 may receive some of the ingredients for beverage production therein and the remaining ingredients may be received in the ingredient feeder 3. The remaining ingredients received in the ingredient feeder 3 may be fed to the fermentation container 12 along with the water supplied from the water supply module 5 or may be mixed with some of the ingredients received in the fermentation container 12.

A main ingredient essential for beverage production may be received in the fermentation container 12 and additives that are added to the main ingredient may be received in the ingredient feeder 3. In this case, the additives received in the ingredient feeder 3 may be mixed with the water fed from the water supply module 5 and fed to the fermentation container 12 or may be mixed with the main ingredient received in the fermentation container 12.

The main ingredient received in the fermentation container 12 may be an ingredient which is more abundant than other ingredients. For example, in the case of beer production, the main ingredient may be malt among the malt, yeast, hop, and flavor additives. In addition, additives received in the ingredient feeder 3 may be ingredients other than the malt among the ingredients for beer production, therefore, may be the yeast, hop, and flavoring additives, for example.

The beverage maker may not include the ingredient feeder 3 and include only the fermentation container 12. In this case, the fermentation container 12 may receive the main ingredient therein, and a user may directly add the additives into the fermentation container 12.

When the beverage maker includes both the ingredient feeder 3 and the fermentation container 12, the beverage may be more easily produced. For the sake of convenience, a following description will be given as an example including both the ingredient feeder 3 and the fermentation container 12. However, embodiments are not limited to the example including both the ingredient feeder 3 and the fermentation container 12.

The ingredients in the fermentation container 12 may be fermented over time. In addition, the produced beverage in the fermentation container 12 may flow to the second main channel 42 through the main channel connection 115 and may flow from the second main channel 42 to the beverage discharger 6 and be discharged therefrom.

The ingredient feeder 3 may receive the ingredients required for beverage production and may be configured to allow the water supplied from the water supply module 5 to pass therethrough. For example, when the beverage produced in the beverage maker is beer, the ingredients received in the ingredient feeder 3 may be yeast, hop, and flavoring additives, for example.

The ingredients received in the ingredient feeder 3 may be directly and respectively received in the ingredient receiving portions 31, 32, and 33 formed in the ingredient feeder 3. At least one ingredient receiving portion 31, 32, and/or 33 may be formed in the ingredient feeder 3. A plurality of ingredient receiving portions 31, 32, and 33 may be formed in the ingredient feeder 3. In this case, the plurality of ingredient receiving portions 31, 32, and 33 may be partitioned from each other.

Each of the ingredient receiving portions 31, 32, and 33 may have an inlet 31a, 32a, and 33a into which the fluid flows and an outlet 31b, 32b, and 33b through which the fluid may flow out. The fluid entering the inlet of one ingredient receiving portion may be mixed with the ingredient in the ingredient receiving portion and then the mixture may exit through the outlet.

In one embodiment, ingredients received in the ingredient feeder 3 may be respectively received in ingredient containers C1, C2, and C3. In this case, the ingredient receiving portions 31, 32, and 33 may respectively receive the ingredient containers C1, C2, and C3. Each of the ingredient receiving portions 31, 32, and 33 may be referred to as an ingredient container mount. The ingredient containers C1, C2, and C3 may be, for example, a capsule or a pod; however, embodiments are not limited thereto.

When the ingredients are respectively received in the ingredient containers C1, C2, and C3, the ingredient feeder 3 may be configured to receive and have withdrawn therefrom the ingredient containers C1, C2, and C3. In addition, the ingredient feeder 3 may be configured as an ingredient container kit assembly in which the ingredient containers C1, C2, and C3 may be removably received.

For example, the ingredient feeder 3 may receive a first additive, a second additive, and a third additive. The first additive may be yeast, the second additive may be hop, and the third additive may be flavoring additive. The ingredient feeder 3 may include a first ingredient container mount 31 in which first ingredient container C1 receiving therein the first additive may be received; a second ingredient container mount 32 in which second ingredient container C2 receiving therein the second additive may be received; and a third ingredient container mount 33 in which a third feeding container C3 receiving therein the third additive may be received.

The ingredients respectively contained in the ingredient receiving portions 31, 32, and 33 or ingredient containers C1, C2, and C3 may be discharged by water pressure of water supplied from the water supply module 5. When the ingredients are discharged by the water pressure, the water fed from the water supply module 5 to the first main channel 41 may be mixed with the ingredients while passing through the ingredient receiving portions 31, 32, and 33 or ingredient containers C1, C2, and C3. Further, the ingredients respectively contained in the ingredient receiving portions 31, 32, and 33 or ingredient containers C1, C2, and C3 may flow to the second main channel 42 along with the water.

A number of additives of different types may be received separately in the ingredient feeder 3. For example, in the production of beer, a number of additives received in the ingredient feeder 3 may be yeast, hop, and a flavoring additive, which may be received separately.

When a plurality of ingredient receiving portions is formed in the ingredient feeder 3, the plurality of ingredient receiving portions 31, 32, and 33 may be connected in series or in parallel in a flow direction of the water. For example, when the plurality of ingredient receiving portions is connected in series as shown in FIG. 1, first main channel 41 may be connected to inlet 31a of first ingredient container mount 31, outlet 31b of first ingredient container mount 31 may be in communication with inlet 32a of the second ingredient container mount 32, outlet 32b of the second ingredient container mount 32 may be in communication with inlet 33a of the third ingredient container mounting portion 33, and outlet 33b of the third ingredient container mount 33 may be connected to the second main channel 42.

Hereinafter, water supply module 5 will be described.

The water supply module 5 may include a water tank 51, a water supply pump 52 that pumps water in the water tank 51, and a water supply heater 53 that heats the pumped water from the water supply pump 52. The water tank 51 and the water supply pump 52 may be connected to a water tank outflow channel 55a and the water contained in the water tank 51 may be suctioned into the water supply pump 52 through the water tank outflow channel 55a.

The water supply pump 52 and the first end 41a of the first main channel 41 may be connected to a water supply channel 55b and the water discharged from the water supply pump 52 may be guided to the first main channel 41 through the water supply channel 55b. The water supply heater 53 may be installed on the water supply channel 55b.

When driving the water supply pump 52, the water in the water tank 51 may be suctioned into the water supply pump 52 through the water tank outflow channel 55a and the water discharged from the water supply pump 52 may be heated in the water supply heater 53 and guided to the first main channel 41 while flowing through the water supply channel 55b.

Hereinafter, beverage discharger 6 will be described.

The beverage discharger 6 may be connected to the second main channel 42. The beverage discharger 6 may include a first beverage discharge channel 61 in communication with the fermenting module 1; a beverage discharge valve 64 installed on the first beverage discharge channel 61; and a dispenser 62 connected to the second beverage discharge channel (second dispenser channel) 602.

The first beverage discharge channel 61 may be connected to the second main channel 42 to communicate with the fermenting module 1. That is, the first beverage discharge channel 61 may communicate with the beverage producing space S2 in the fermentation container 12.

One or a first end 60 of the first beverage discharge channel 61 may be connected to the second main channel 42 between the ingredient feeder 3 and the main valve 40 and the other or a second end thereof may be connected to the dispenser 62. The beverage discharge valve 64 which opens and closes the first beverage discharge channel 61 may be installed on the first beverage discharge channel 61. The beverage discharge valve 64 may include a solenoid valve.

When the beverage is discharged, the beverage discharge valve 64 may be opened. Further, when the beverage is not discharged, the beverage discharge valve 64 may be kept closed.

The beverage from the beverage discharge valve 64 may be guided to the dispenser 62. The user may manipulate the dispenser 62 to adjust the discharging of the beverage. When the user opens the dispenser 62, the beverage may be discharged from the dispenser 62. The dispenser 62 will be described hereinbelow.

Hereinafter, gas discharger 7 will be described.

The gas discharger 7 may be connected to the fermenting module 1 and discharge gas generated in the fermentation container 12. The gas discharger 7 may include a gas discharge channel 71 connected to the fermenting module 1, and a gas discharge valve 73 connected to the gas discharge channel 71.

The gas discharge channel 71 may be connected to the fermenting module 1, in particular, to the fermentation lid 107. The fermentation lid 107 may be provided with a gas discharge channel connection 121 to which the gas discharge channel 71 may be connected.

The beverage maker may inject air into the fermentation container 12 by the air injector 8 to evenly mix the malt and the water with each other. Bubbles generated in the liquid malt may be discharged to the outside through the gas discharge channel 71 and the gas discharge valve 73 at an upper portion of the fermentation container 12. Further, the gas discharge valve 73 may be kept closed during fermentation of the beverage.

Hereinafter, air injector 8 will be described.

The air injector 8 may be connected to the water supply channel 55b or to the first main channel 41 to inject the air. The air injected from the air injector 8 into the first main channel 41 may be injected into the fermentation container 12 through the bypass channel 43 and the second main channel 42 in sequence. Thus, agitation or aeration may be performed in the fermentation container 12.

In addition, the air injected from the air injector 8 into the first main channel 41 may remove residual water or residue while passing through the ingredient container mounts 31, 32, and 33. This allows the ingredient container mounts 31, 32, and 33 to remain clean.

The air injector 8 may include an air injection channel 81 connected to the water supply channel 55b or the first main channel 41, and air pump 82 connected to the air injection channel 81. The air pump 82 may pump air into the air injection channel 81.

Hereinafter, air regulator 15 will be described.

The air regulator 15 may regulate a pressure between the inner wall of the fermentation vessel 112 and the outer face of the fermentation container 12. The air regulator 15 may supply air between the fermentation container 12 and the inner wall of the fermentation vessel 112, or may exhaust the air between the fermentation container 12 and the inner wall of the fermentation vessel 112 to the outside.

The air regulator 15 may include an air supply channel 154 connected to the fermenting module 1, and an air exhaust channel 157 connected to the air supply channel 154 and exhausting the air to the outside. One or a first end 154a of the air supply channel 154 may be connected to the first main channel 41 and the other or a second end thereof may be connected to the fermenting module 1.

The fermenting module 1 may be provided with an air supply channel connection 117 to which the air supply channel 154 may be connected. Further, the air supply channel connection 117 may be in communication with the space between the inner wall of the fermentation vessel 112 and the outer face of the fermentation container 12. In one embodiment, the air supply channel connection 117 may be provided at the fermentation lid 107 rather than at the fermentation vessel 112.

The air injected from the air injector 8 into the first main channel 41 may be guided through the air supply channel 154 between the outer face of the fermentation container 12 and the inner wall of the fermentation vessel 112. Thus, the air supplied into the fermentation vessel 112 may pressurize the fermentation container 12 between the outer face of the fermentation container 12 and the inner wall of the fermentation vessel 112.

The beverage in the fermentation container 12 may be pressurized by the fermentation container 12 pressurized by the air and may flow through the main channel connection 115 to the second main channel 42 when the main valve 40 and the beverage discharge valve 64 are opened. The beverage flowing from the fermentation container 12 to the second main channel 42 may be discharged out through the beverage discharger 6. The air exhaust channel 157 may function as an air exhaust passage that exhausts the air between the fermentation container 12 and the fermentation vessel 112 to the outside, together with a portion of the air supply channel 154.

The air supply channel 154 may include a first channel from the connection 154a, to which the first main channel 41 may be connected, to a connection 157a to which the air exhaust channel 157 is connected; and a second channel from the connection 154a, to which the air exhaust channel 157 may be connected, to the air supply channel connection 117. The first channel may be an air supply channel that directs the air pumped from the air pump 82 to the second channel. Further, the second channel may be an air supply and exhaust channel that supplies the air passed through the air supply channel to between the fermentation vessel 112 and the fermentation container 12, or for directing the air flowing out between the fermentation vessel 112 and the fermentation container 12 to the connection channel 157.

An exhaust valve 156 that opens and closes the air exhaust channel 157 may be connected to the air exhaust channel 157. The exhaust valve 156 may be opened to allow the air between the fermentation container 12 and the fermentation vessel 112 to be exhausted to the outside when the fermentation container 12 is expanded during beverage production.

The air regulator 15 may further include an air supply valve 159 that controls the air pumped at the air pump 82 and then supplied to between the fermentation container 12 and the fermentation vessel 112. The air supply valve 159 may be installed on the air supply channel 154. That is, the air supply valve 159 may be installed between the connection 154a to the first main channel 41 of the air supply channel 154 and the connection 157a to the air exhaust channel 157.

Figure 2:
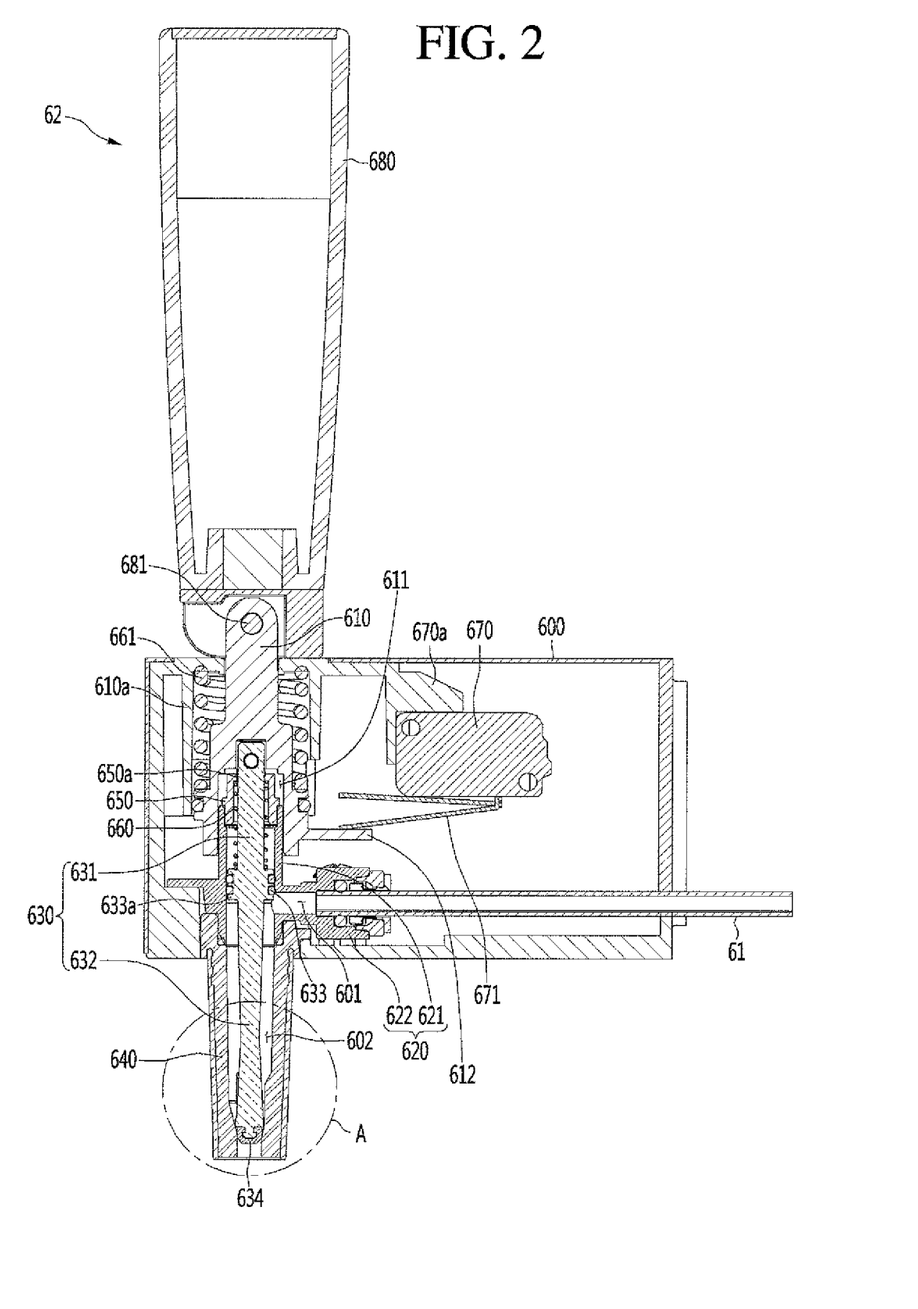
FIG. 2 is a cross-sectional view illustrating an interior of a dispenser according to an embodiment.
Figure 3:
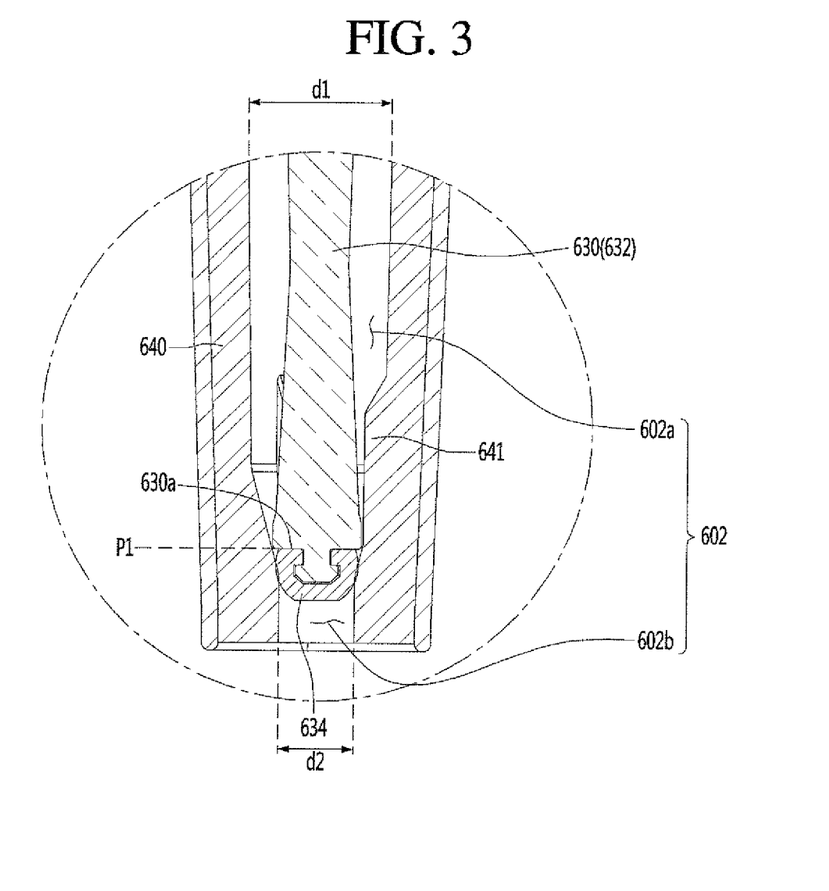
FIG. 3 is an enlarged view of portion A in FIG. 2.
Figure 4:
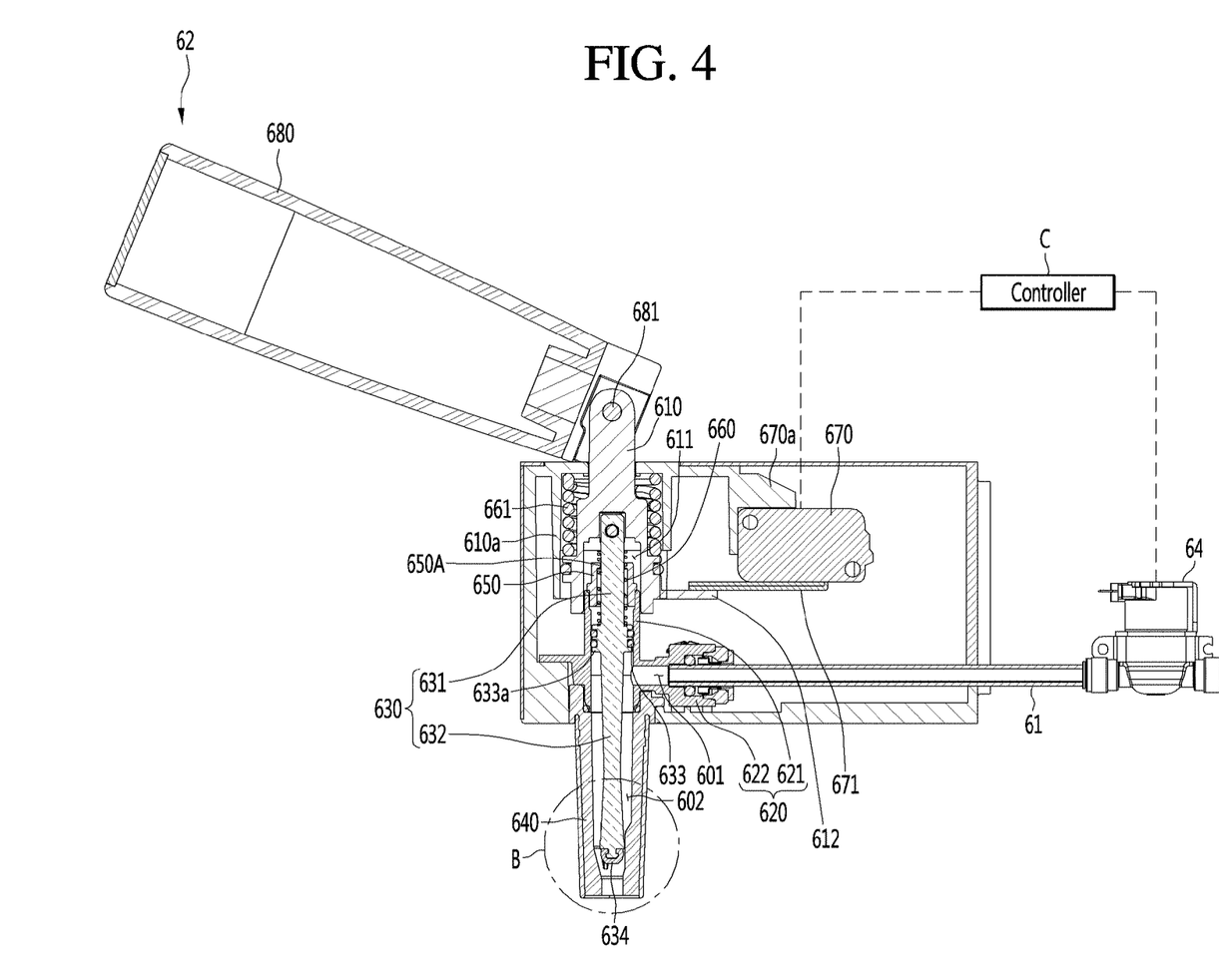
FIG. 4 is a view illustrating an interior of a dispenser and a beverage discharge valve when the dispenser is opened according to an embodiment.
Figure 5:
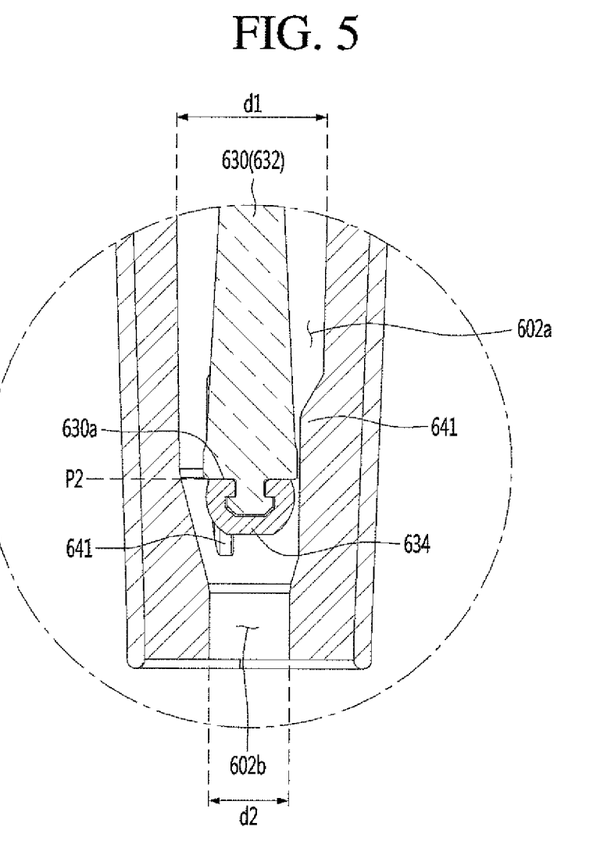
FIG. 5 is an enlarged view of portion B in FIG. 4.
Figure 6:
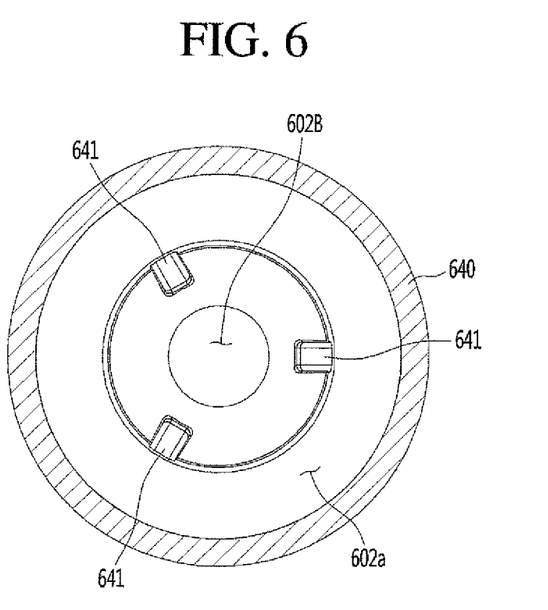
FIG. 6 is a top view illustrating an interior of a discharge body according to an embodiment.

FIG. 2 is a cross-sectional view illustrating an interior of a dispenser according to an embodiment. FIG. 3 is an enlarged view of portion A in FIG. 2. FIG. 4 is a view illustrating an interior of a dispenser and a beverage discharge valve when the dispenser is opened according to an embodiment. FIG. 5 is an enlarged view of portion B in FIG. 4. FIG. 6 is a top view illustrating an interior of a discharge body according to an embodiment.

The dispenser 62 according to an embodiment may include a dispenser case 600, a channel body 620, a discharge body 640, an ascending and descending body 610, a shaft 630, and a guide rib 641. The dispenser case 600 may form an outer appearance of the dispenser 62.

The channel body 620 may be at least partially positioned inside of the dispenser case 600. The channel body 620 may have a first dispenser channel 601 defined therein that communicates with the beverage discharge channel 61. That is, the beverage discharge channel 61 may be connected to the channel body 620. In this case, the beverage discharge channel 61 may be inserted into the dispenser case 600 and connected to the channel body 620. However, without being limited thereto, when a portion of the channel body 620 protrudes outwardly of the dispenser case 600, the beverage discharge channel 61 may be connected to the channel body 620 at a position outside of the dispenser case 600.

The channel body 620 may include a shaft receiving portion 621 to receive a portion of the shaft 630 therein, and a channel defining portion 622 connected to the shaft receiving portion 621 and connected to the first dispenser channel 601. The shaft receiving portion 621 may extend in a vertical direction in an elongated manner. Further, the shaft receiving portion 621 may have a hollow defined therein, in which a portion of the shaft 630 may be disposed therein. An inner circumference of the shaft receiving portion 621 may face an outer circumference of the shaft 630. The inner circumference of the shaft receiving portion 621 and the outer circumference of the shaft 630 may be spaced apart from each other.

The channel defining portion 622 may be connected to the shaft receiving portion 621. The channel defining portion 622 may be integrally formed with the shaft receiving portion 621.

The first dispenser channel 601 may be defined in the channel defining portion 622. The beverage discharge channel 61 may be connected to the channel defining portion 622 to communicate with the first dispenser channel 601.

The channel defining portion 622 may extend in a horizontal direction in an elongated manner. Thus, the first dispenser channel 601 may be defined horizontally.

The discharge body 640 may extend in the vertical direction in an elongated manner. The discharge body 640 may be provided below the dispenser case 600 and may protrude downwardly of the dispenser case 600. The beverage may be finally discharged from the discharge body 640.

The discharge body 640 may be coupled to the channel body 620. The discharge body 640 may have a second dispenser channel 602 defined therein that communicates with the first dispenser channel 601 of the channel body 620. The second dispenser channel 602 may extend in the vertical direction in an elongated manner.

The second dispenser channel 602 may include a lower channel 602b defined in a bottom portion of the discharge body 640 and an upper channel 602a positioned above the lower channel 602b. The lower channel 602b may be defined in the bottom portion of the discharge body 640. The beverage may be dispensed out of the discharge body 640 through the lower channel 602b.

The upper channel 602a may provide communication between the lower channel 602b and the first dispenser channel 601. The upper channel 602a may guide the beverage in the first dispenser channel 601 to the lower channel 602b.

The lower channel 602b may be opened and closed by a packing 634 provided at a bottom of the shaft 630. A diameter d2 of the lower channel 602b may be smaller than a diameter d1 of the upper channel 602a. Thus, opening and closing of the lower channel 602b by the packing 634 may be easily performed.

As the lower channel 602b positioned at the bottom portion of the discharge body 640 is closed by the packing 634, an amount of residual beverage in the beverage discharger 6 may be reduced in comparison with a case in which the first dispenser channel 601 or the upper channel 602a is closed by the packing 634. For example, when the packing 634 closes the first dispenser channel 601, even when the dispenser 62 is closed, the residual beverage in the second dispenser channel 602 may be dispensed from the discharge body 640. In addition, beverage discharging at a correct capacity may become difficult.

The guide rib 641 may be formed on an inner face of the discharge body 640 and may guide a bottom portion 630a of the shaft 630. The guide rib 641 may guide the bottom portion 630a of the shaft 630 such that the packing 634 correctly closes the lower channel 602b when the shaft 630 descends.

The guide rib 641 may protrude from an inner face of the discharge body 640 toward the second dispenser channel 602. The guide rib 641 may extend in an elongated manner.

The guide rib 641 may include a plurality of guide ribs spaced apart from each other by a predetermined distance along an inner circumference of the discharge body 640. For example, the guide rib 641 may include three guide ribs.

The guide rib 641 may be formed at a position closer to a bottom of the discharge body 640 than to a top of the discharge body 640. That is, the guide rib 641 may be formed at a position adjacent to a bottom portion of the discharge body 640.

The ascending and descending body 610 may be connected to the dispenser case 600 in an ascending and descending manner. The ascending and descending body 610 may extend in an elongated manner.

An ascending and descending body guide 610a that guides the ascending and descending body 610 in the vertical direction may be formed in the dispenser case 600. A hollow in which the ascending and descending body 610 may be at least partially disposed may be defined in the ascending and descending body guide 610a. An inner circumference of the ascending and descending body guide 610a may surround an outer circumference of the ascending and descending body 600. The ascending and descending body guide 610a may be formed so as not to interfere with a manipulation protrusion 612 described hereinbelow.

The ascending and descending body 610 may be connected to an operating portion disposed in the dispenser case 610, and may ascend and descend based on an operation of the operating portion. In one embodiment, the operating portion may include a lever 680, and the ascending and descending body 610 may be connected to the lever 680 by a hinge 681. The lever 680 may be disposed above the dispenser case 600 and an upper portion of the ascending and descending body 610 may protrude upwardly of the dispenser case 600 and be connected to the lever 680 by the hinge 681.

In this case, when the lever 680 is erected, the ascending and descending body 610 may be maintained in a descended state. In addition, when the user pulls the lever 680, the ascending and descending body 610 may ascend.

The ascending and descending body 610 may ascend and descend while positioned above the channel body 620, that is, above the shaft receiving portion 621. The ascending and descending body 610 may have a cut-off 611 that prevents interference with the shaft receiving portion 621.

A bottom face of the ascending and descending body 610 may be recessed upwardly to define the cut-off 611. At least a portion of the shaft receiving portion 621 may be positioned within the cut-off 611. That is, an inner circumference of the cut-off 611 may surround an outer circumference of the shaft receiving portion 621.

The shaft 630 may be connected to the ascending and descending body 610 to ascend and descend with the ascending and descending body 610. The shaft 630 may extend in the vertical direction in an elongated manner.

An upper portion of the shaft 630 may be connected to the ascending and descending body 610. The bottom portion 630a of the shaft 630 may have the packing 634 that opens and closes the second dispenser channel 602, that is, the lower channel 602b. The packing 634 may be formed of an elastic material, such as rubber or silicone, for example, or may serve as a sealing when the second dispenser channel 602 is closed.

When the lever 680 is erected, the ascending and descending body 610 and the shaft 630 may be maintained in a descended state and the second dispenser channel 602 may be maintained closed by the packing 634. Further, when the user pulls the lever 680, the ascending and descending body 610 and the shaft 630 may ascend to a vertical level at which the packing 634 opens the second dispenser channel 602.

In this case, the bottom portion 630a of the shaft 630 may ascend and descend between a first point P1 at which the packing 634 closes the second dispenser channel 602 and a second point P2 at which the packing 634 opens the second dispenser channel 602. The first point P1 may be positioned below the second point P2.

The bottom portion 630a of the shaft 630 may horizontally overlap with the guide rib 641. When the bottom portion 630a of the shaft 630 is positioned at the first point P1, the bottom portion 630a may horizontally overlap with the guide rib 641. Further, when the bottom portion 630a is positioned at the second point P2, the bottom portion 630a may horizontally overlap with the guide rib 641. Thus, the bottom portion 630a of the shaft 630 may be stably guided by the guide rib 641 when the shaft 630 ascends or descends.

The shaft 630 may include an upper body 631 and a lower body 632. The upper body 631 may be at least partially positioned inside of the shaft receiving portion 621 of the channel body 620. Further, the upper body 631 may be connected to the ascending and descending body 610.

A sealing ring 633 being in contact with an inner circumference face of the shaft receiving portion 621 may be disposed on an outer circumference of the upper body 631. The sealing ring 633 may prevent beverage flowing into the first dispenser channel 601 and the second dispenser channel 602 from entering the shaft receiving portion 621.

The sealing ring 633 may include an o-ring. The sealing ring 633 may include a plurality of sealing rings.

The sealing ring 633 may be formed of an elastic material, such as rubber, or silicone, for example, and may be compressed between the outer circumference of the upper body 631 and the inner circumference of the shaft receiving portion 621. Thus, the sealing ring 633 may effectively seal a gap between the outer circumference of the upper body 631 and the inner circumference of the shaft receiving portion 621.

A sealing ring mount 633a in which the sealing ring 633 may be mounted may be formed on the outer circumference of the upper body 631. The sealing ring mount 633a may include a plurality of protrusions that protrudes from the outer circumference of the upper body 631 radially and outwardly of the upper body 631 and spaced apart from each other in the vertical direction. The sealing ring 633 may be fitted and mounted between the plurality of protrusions.

The lower body 632 may be connected to a bottom face of the upper body 631. Further, the lower body 632 may be integrally formed with the upper body 631.

The lower body 632 may be at least partially positioned inside of the discharge body 640. That is, the lower body 632 may be at least partially positioned in the second dispenser channel 602. The lower body 632 may be formed to have a diameter such that the lower body 632 does not block the second dispenser channel 602. The beverage may flow between the outer circumference of the lower body 632 and the inner circumference of the discharge body 640 in the second dispenser channel 602.

The packing 634 may be provided at the bottom portion 630a of the lower body 632. Further, the bottom portion 630a of the lower body 632 may refer to the bottom portion 630a of the shaft 630.

The dispenser 62 may further include a shaft support 650 that supports an upper portion of the shaft 630 in the horizontal direction. The shaft support 650 may be coupled to the channel body 620, that is, to the shaft receiving portion 621. In one embodiment, the shaft support 650 may be integrally formed with the channel body 620.

The shaft support 650 may be positioned within the cut-off 611 of the ascending and descending body 610. The shaft support portion 650 may be formed in a hollow tube shape having an open bottom face and a top face having a through hole 650a defined therein. The upper body 631 of the shaft 630 may pass through the through hole 650a. In this case, the outer circumference of the upper body 631 may be in contact with an inner circumference of the through hole 650a and supported in the horizontal direction.

Thus, the upper portion of the shaft 630 may be supported in the horizontal direction by the shaft support 650 and the lower portion of the shaft 630 may be supported in the horizontal direction by the guide rib 641. Therefore, the shaft 630 may ascend and descend stably without shaking during the ascending and descending.

The dispenser 62 may further include a first pressing spring 660 that elastically presses the shaft 630 downwardly, and a second pressing spring 661 that elastically presses the ascending and descending body 610 downwardly.

The first pressing spring 660 may be wound around the outer circumference of the shaft 630, that is, of the upper body 631. The first pressing spring 660 may be positioned inside the shaft receiving portion 621.

The first pressing spring 660 may be provided in a compressed state. In one embodiment, the first pressing spring 660 may maintain the compressed state between the shaft support 650 and the sealing ring mount 633a; however, embodiments are not limited thereto.

The second pressing spring 661 may be wound around the outer circumference of the ascending and descending body 610. The second pressing spring 661 may be positioned inside the ascending and descending body guide 610a.

The second pressing spring 661 may be provided in a compressed state. In one embodiment, the second pressing spring 661 may be maintained in the compressed state between the dispenser case 600 and the ascending and descending body 610; however, embodiments are not limited thereto.

A reliability of the packing 634 may be improved by elastic forces of the first pressing spring 660 and the second pressing spring 661. When the user pulls the lever 680 and then releases it removing an external force, the ascending and descending body 610 and the shaft 630 may immediately descend due to elastic forces of the first pressing spring 680 and the second pressing spring 661, so that the second dispenser channel 602 may be closed by the packing 634.

The dispenser 62 may further include a micro switch 670 for sensing opening and closing of the dispenser 62. The micro switch 670 may include a limit switch.

The micro switch 670 may be received in the dispenser case 600. A switch mount 670a to mount the micro switch 670 therein may be formed in the dispenser case 600.

The micro switch 670 may be turned on by the ascending and descending body 610. The manipulation protrusion 612, which may be engaged with a terminal 671 of the micro switch 670 when the ascending and descending body 610 ascends may protrude from the ascending and descending body 610.

The manipulation protrusion 612 may protrude outwardly of the outer circumference of the ascending and descending body 610. When the ascending and descending body 610 ascends, the terminal 671 of the micro switch 670 may be engaged with the manipulation protrusion 612 and the micro switch 670 may be turned on. On the other hand, when the ascending and descending body 610 descends, the terminal 671 of the micro switch 670 may be disengaged from the manipulation protrusion 612 and the micro switch 670 may be turned off.

That is, when the user pulls the lever 680, the ascending and descending body 610 may ascend to turn on the micro switch 670. Further, when the lever 680 is erected vertically, the ascending and descending body 610 may descend to turn off the micro switch 670.

The micro switch 670 may be electrically connected to a controller C of the beverage maker. The controller C may control the beverage discharge valve 64 based on the on/off state of the micro switch 670.

As described above, the beverage discharge valve 64 may be installed on the beverage discharge channel 61 to open and close the beverage discharge channel 61. The beverage discharge valve 64 may be located outside of the dispenser case 600, which may allow the dispenser 62 to be compact in size.

When the user manipulates the lever 680 in a direction of opening the dispenser 62, the ascending and descending body 610 ascends and the micro switch 670 is turned on. In addition, the controller C may sense opening of the dispenser 62. In this case, the controller C may open the beverage discharge valve 64.

Conversely, when the user manipulates the lever 680 in a direction of closing the dispenser 62 or when the external force that has been applied to the lever 680 is removed, the ascending and descending body 610 descends and the micro switch 670 is turned off. In addition, the controller C may sense closure of the dispenser 62. In this case, the controller C may close the beverage discharge valve 64.

Accordingly, the beverage maker may easily control dispensing of the beverage by having an electronic opening/closing structure in which the beverage discharge valve 64 is opened and closed based on the on/off state of the micro switch 670.

In addition, a mechanical opening/closing operation by the packing 634 of the shaft 630 and an electronic opening/closing operation by the beverage discharge valve 64 are linked to each other, so that a convenience of the user and a reliability of the beverage discharger 6 may be further improved.

Embodiments disclosed herein provide a beverage discharger with improved reliability of an opening/closing operation and a beverage maker including a beverage discharger. Embodiments disclosed herein further provide a beverage maker in which a mechanical opening/closing operation is linked with an electronic opening/closing operation.

In a beverage discharger according to embodiments, a bottom portion of a shaft is guided by a guide rib formed on an inner face of a discharge body such that a packing disposed at the bottom portion of the shaft may stably open and close a dispenser channel. In addition, reliability of an opening/closing operation may be improved.

Embodiments disclosed herein provide a beverage discharger that may include a dispenser case; a channel body at least partially disposed in the dispenser case, the channel body having a first dispenser channel defined therein that communicates with a beverage discharge channel; a discharge body coupled to the channel body and having a second dispenser channel defined therein in communication with the first dispenser channel, the discharge body extending in a vertical direction in an elongated manner; an ascending and descending body connected to the dispenser case in an ascending and descending manner; a shaft connected to the ascending and descending body to ascend and descend together with the ascending and descending body, the shaft having, at a bottom thereof, a packing that opens and closes the second dispenser channel; and a guide rib formed on an inner face of the discharge body to guide the bottom portion of the shaft. The guide rib may be formed at a position closer to a bottom of the discharge body than to a top thereof.

Further, the guide rib may protrude from the inner face of the discharge body toward the second dispenser channel. The guide rib may include a plurality of guide ribs spaced apart from each other by a predetermined distance along an inner circumference of the discharge body.

The bottom portion of the shaft may ascend and descend between a first point at which the packing closes the second dispenser channel and a second point at which the packing opens the second dispenser channel. Further, the bottom portion of the shaft may horizontally overlap with the guide rib when the bottom portion of the shaft is positioned at the first point and the second point.

The second dispenser channel may include a lower channel defined in a bottom portion of the discharge body and opened/closed by the packing, and an upper channel disposed above the lower channel. The shaft may be at least partially disposed in the upper channel. A diameter of the upper channel may be greater than a diameter of the lower channel.

The channel body may include a shaft receiving portion that extends in a vertical direction in an elongated manner and receiving a portion of the shaft therein, and a channel defining portion connected to the beverage discharge channel. The first dispenser channel may be defined in the channel defining portion.

The beverage discharger may further include a shaft support that supports an upper portion of the shaft in a horizontal direction. The shaft support may be coupled to the shaft receiving portion.

The shaft may include an upper body connected to the ascending and descending body and at least partially positioned inside of the shaft receiving portion, and a lower body connected to a bottom face of the upper body and at least partially positioned inside of the discharge body. The packing may be disposed on a bottom portion of the lower body. A sealing ring in contact with an inner circumference face of the shaft receiving portion may be disposed on an outer circumference of the upper body.

The beverage discharger may further include a first pressing spring wound around the outer circumference of the upper body and positioned inside the shaft receiving portion. The first pressing spring may elastically press the shaft downwardly.

The beverage discharger may further include a second pressing spring wound around an outer circumference of the ascending and descending body. The second pressing spring may elastically press the ascending and descending body downwardly.

In the beverage discharger according to embodiments disclosed herein, the micro switch may be turned on/off when the mechanical opening/closing operation by the packing disposed on the shaft is performed, so that a beverage discharge valve may be opened/closed by a controller. Thus, the mechanical opening/closing operation and the electronic opening/closing operation may be linked with each other.

Embodiments disclosed herein further provide a beverage discharger that may include a dispenser case; a channel body at least partially disposed in the dispenser case, the channel body having a first dispenser channel defined therein that communicates with a beverage discharge channel; a discharge body coupled to the channel body and having a second dispenser channel defined therein in communication with the first dispenser channel, the discharge body extending in a vertical direction in an elongated manner; an ascending and descending body connected to the dispenser case in an ascending and descending manner; a shaft connected to the ascending and descending body to ascend and descend together with the ascending and descending body, the shaft having, at a bottom portion thereof, a packing that opens and closes the second dispenser channel; a micro switch received in the dispenser case, the micro switch being configured to be turned on by a manipulation protrusion formed on the ascending and descending body when the ascending and descending body ascends; and a beverage discharge valve installed on the beverage discharge channel. The beverage discharge valve may be closed by a controller when the micro switch is turned on. The beverage discharge valve may be positioned outside of the dispenser case.

Embodiments disclosed herein also provide a beverage discharger that may include a dispenser channel that extends in a vertical direction in an elongated manner; a shaft that ascends and descends in a vertical direction; a packing disposed at a bottom portion of the shaft to open and close the second dispenser channel; and a guide rib positioned inside the dispenser channel that guides the bottom portion of the shaft. The bottom portion of the shaft may ascend and descend between a first point at which the packing closes the dispenser channel and a second point at which the packing opens the dispenser channel. The bottom portion of the shaft may horizontally overlap with the guide rib when the bottom portion of the shaft is positioned at the first point and the second point.

The dispenser channel may include a lower channel defined in the bottom portion of the discharge body and opened/closed by the packing, and an upper channel disposed above the lower channel. The shaft may be at least partially positioned in the upper channel. A diameter of the upper channel is greater than a diameter of the lower channel. The guide rib may include a plurality of guide ribs spaced apart from each other by a predetermined distance along an inner circumference of the dispenser channel.

The beverage discharger may further include an ascending and descending body connected to the shaft; a micro switch configured to be turned on by a manipulation protrusion formed on the ascending and descending body when the ascending and descending body ascends; and a beverage discharge valve configured to be closed when the micro switch is turned on, such that beverage does not flow into the dispenser channel. The beverage discharger may further include a first pressing spring that presses the shaft downwardly, and a second pressing spring that presses the ascending and descending body downwardly.

The bottom portion of the shaft may be guided by the guide rib, so that the packing disposed at the bottom portion of the shaft may stably open and close the dispenser channel. In addition, reliability of the opening/closing operation may be improved.

In addition, the bottom portion of the shaft may always overlap with the guide rib in the horizontal direction regardless of the ascending and descending of the shaft, so that an entire ascending and descending operation may be performed stably. Further, as the packing opens and closes the lower channel defined in the bottom portion of the discharge body, an amount of residual beverage flowing down after the closing of the beverage discharger may be minimized.

Furthermore, the lower channel opened and closed by the packing may be easily opened and closed by the packing because the diameter of the lower channel is smaller than the diameter of the upper channel above the lower channel. Also, the upper and lower portions of the shaft may be respectively supported horizontally by the shaft support and the guide rib, so that the shaft may stably ascend and descend without shaking.

The sealing ring may prevent the beverage from entering the shaft receiving portion. Further, reliability of the packing may be improved by elastic forces of the first pressing spring and the second pressing spring.

The dispensing of the beverage may be easily controlled by the electronic opening/closing structure in which the beverage discharge valve is opened and closed based on the on/off of the micro switch. The mechanical opening/closing operation by the packing of the shaft and the electronic opening/closing operation by the beverage discharge valve are linked to each other, so that convenience of the user and reliability of the beverage discharger may be further improved.

The foregoing description is merely illustrative of the technical idea. Embodiments may be variously modified and altered by those skilled in the art to which the embodiments pertain without departing from the spirit and scope. Therefore, embodiments are provided to explain the spirit and scope, but not to limit them, so that the spirit and scope is not limited by the embodiments. Embodiments should be construed on the basis of the accompanying claims, and all the technical ideas within the scope equivalent to the claims should be included in the scope of the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A beverage discharger, comprising:

a dispenser case;

a channel body at least partially disposed in the dispenser case, wherein the channel body has a first dispenser channel defined therein that communicates with a beverage discharge channel;

a discharge body coupled to the channel body and having a second dispenser channel defined therein in communication with the first dispenser channel, wherein the discharge body extends in a vertical direction in an elongated manner;

an ascending and descending body connected to the dispenser case in an ascending and descending manner;

a shaft connected to the ascending and descending body to ascend and descend together with the ascending and descending body, wherein the shaft has, at a bottom thereof, a packing that opens and closes the second dispenser channel; and at least one guide rib formed on an inner face of the discharge body to guide the bottom of the shaft, wherein the at least one guide rib includes a plurality of guide ribs spaced apart from each other by a predetermined distance along an inner circumference of the discharge body.

2. The beverage discharger of claim 1, wherein the plurality of guide ribs is formed at a position closer to a bottom of the discharge body than to a top of the discharge body.

3. The beverage discharger of claim 1, wherein the plurality of guide ribs protrudes from the inner face of the discharge body into the second dispenser channel.

4. The beverage discharger of claim 1, wherein the bottom of the shaft ascends and descends between a first point at which the packing closes the second dispenser channel and a second point at which the packing opens the second dispenser channel, and wherein the bottom of the shaft horizontally overlaps with the plurality of guide ribs when the bottom of the shaft is positioned at the first point and the second point.

5. The beverage discharger of claim 1, wherein the second dispenser channel includes:
a lower channel defined in a bottom portion of the discharge body and opened/closed by the packing; and
an upper channel disposed above the lower channel, wherein the shaft is at least partially disposed in the upper channel, and wherein a diameter of the upper channel is greater than a diameter of the lower channel.

6. The beverage discharger of claim 1, wherein the channel body includes:
a shaft receiving portion that extends in a vertical direction in an elongated manner and configured to receiving a portion of the shaft therein; and
a channel defining portion connected to the beverage discharge channel, and wherein the first dispenser channel is defined in the channel defining portion.

7. A beverage maker comprising the beverage discharger of claim 1.

8. A beverage discharger, comprising:
a dispenser case;
a channel body at least partially disposed in the dispenser case, wherein the channel body has a first dispenser channel defined therein that communicates with a beverage discharge channel;
a discharge body coupled to the channel body and having a second dispenser channel defined therein in communication with the first dispenser channel, wherein the discharge body extends in a vertical direction in an elongated manner;
an ascending and descending body connected to the dispenser case in an ascending and descending manner;
a shaft connected to the ascending and descending body to ascend and descend together with the ascending and descending body, wherein the shaft has, at a bottom thereof, a packing that opens and closes the second dispenser channel; and
at least one guide rib formed on an inner face of the discharge body to guide the bottom of the shaft, wherein the channel body includes:
a shaft receiving portion that extends in a vertical direction in an elongated manner and configured to receiving a portion of the shaft therein; and
a channel defining portion connected to the beverage discharge channel, and wherein the first dispenser channel is defined in the channel defining portion, and wherein the beverage discharger further comprises a shaft support that supports an upper portion of the shaft in a horizontal direction, wherein the shaft support is coupled to the shaft receiving portion.

9. A beverage discharger, comprising:
a dispenser case;
a channel body at least partially disposed in the dispenser case, wherein the channel body has a first dispenser channel defined therein that communicates with a beverage discharge channel;
a discharge body coupled to the channel body and having a second dispenser channel defined therein in communication with the first dispenser channel, wherein the discharge body extends in a vertical direction in an elongated manner;
an ascending and descending body connected to the dispenser case in an ascending and descending manner;
a shaft connected to the ascending and descending body to ascend and descend together with the ascending and descending body, wherein the shaft has, at a bottom thereof, a packing that opens and closes the second dispenser channel; and
at least one guide rib formed on an inner face of the discharge body to guide the bottom of the shaft, wherein the channel body includes:
a shaft receiving portion that extends in a vertical direction in an elongated manner and configured to receiving a portion of the shaft therein; and
a channel defining portion connected to the beverage discharge channel, and wherein the first dispenser channel is defined in the channel defining portion, wherein the shaft includes:
an upper body connected to the ascending and descending body and at least partially positioned inside the shaft receiving portion; and
a lower body connected to a bottom face of the upper body and at least partially positioned inside the discharge body, and wherein the packing is disposed on a bottom portion of the lower body.

10. The beverage discharger of claim 9, wherein a sealing ring in contact with an inner circumferential face of the shaft receiving portion is disposed on an outer circumference of the upper body.

11. The beverage discharger of claim 9, further comprising:
a first pressing spring wound around an outer circumference of the upper body and positioned inside the shaft receiving portion, wherein the first pressing spring elastically presses the shaft downwardly.

12. The beverage discharger of claim 11, further comprising:
a second pressing spring wound around an outer circumference of the ascending and descending body, wherein the second pressing spring elastically presses the ascending and descending body downwardly.

13. A beverage discharger, comprising:
a dispenser case;
a channel body at least partially disposed in the dispenser case, wherein the channel body has a first dispenser channel defined therein that communicates with a beverage discharge channel;
a discharge body coupled to the channel body and having a second dispenser channel defined therein in communication with the first dispenser channel, wherein the discharge body extends in a vertical direction in an elongated manner;

an ascending and descending body connected to the dispenser case in an ascending and descending manner;

a shaft connected to the ascending and descending body to ascend and descend together with the ascending and descending body, wherein the shaft has, at a bottom portion thereof, a packing that opens and closes the second dispenser channel;

a micro switch received in the dispenser case, wherein the micro switch is configured to be turned on by a manipulation protrusion formed on the ascending and descending body when the ascending and descending body ascends; and a beverage discharge valve installed on the beverage discharge channel, wherein the beverage discharge valve is closed by a controller when the micro switch is turned on.

14. The beverage discharger of claim 13, wherein the beverage discharge valve is positioned outside of the dispenser case.

15. A beverage maker comprising the beverage discharger of claim 13.

16. A beverage discharger, comprising:
a dispenser channel that extends in a vertical direction in an elongated manner;
a shaft that ascends and descends in the vertical direction;
a packing disposed at a bottom portion of the shaft to open and close the second dispenser channel; and
at least one guide rib positioned inside the dispenser channel that guides the bottom portion of the shaft, wherein the at least one guide rib includes a plurality of guide ribs spaced apart from each other by a predetermined distance along an inner circumference of the dispenser channel.

17. The beverage discharger of claim 16, wherein the bottom portion of the shaft ascends and descends between a first point at which the packing closes the dispenser channel and a second point at which the packing opens the dispenser channel, wherein the bottom portion of the shaft horizontally overlaps with the plurality of guide ribs when the bottom portion of the shaft is positioned at the first point and the second point.

18. The beverage discharger of claim 16, wherein the dispenser channel includes:
a lower channel defined in a bottom portion of discharge body and opened/closed by the packing; and
an upper channel disposed above the lower channel, wherein the shaft is at least partially positioned in the upper channel, and wherein a diameter of the upper channel is greater than a diameter of the lower channel.

19. The beverage discharger of claim 16, further comprising:
an ascending and descending body connected to the shaft;
a micro switch configured to be turned on by a manipulation protrusion formed on the ascending and descending body when the ascending and descending body ascends; and
a beverage discharge valve configured to be closed when the micro switch is turned on, such that beverage does not flow into the dispenser channel.

20. The beverage discharger of claim 19, further comprising:
a first pressing spring that presses the shaft downwardly; and
a second pressing spring that presses the ascending and descending body downwardly.

21. A beverage maker comprising the beverage discharger of claim 16.

* * * * *